United States Patent [19]
Ogura et al.

[11] Patent Number: 5,283,132
[45] Date of Patent: Feb. 1, 1994

[54] ORGANIC ELECTROLUMINESCENT DEVICE FOR WHITE LUMINESCENCE

[75] Inventors: Takashi Ogura, Nara; Takuo Yamashita, Okayama; Masaru Yoshida, Nara; Kazuhiro Emoto, Nagaokakyo; Shigeo Nakajima, Nara, all of Japan

[73] Assignee: Sharp Kabushiki Kaisha, Osaka, Japan

[21] Appl. No.: 849,708

[22] Filed: Mar. 11, 1992

[30] Foreign Application Priority Data

Mar. 13, 1991 [JP] Japan .................................. 3-48143

[51] Int. Cl.$^5$ .................. H05B 33/14; H01J 1/63; B32B 17/06
[52] U.S. Cl. ................................ 428/690; 428/917; 313/503; 313/504
[58] Field of Search ............... 428/690, 917, 212, 336; 313/504, 503

[56] References Cited

U.S. PATENT DOCUMENTS 5,059,863  10/1991  Tashiro ........................ 313/504

FOREIGN PATENT DOCUMENTS 4-88079  3/1992  Japan .

*Primary Examiner*—Henry F. Epstein
*Assistant Examiner*—Charles R. Nold

[57] ABSTRACT

An organic electroluminescent device for white luminescence, which includes a pair of opposite electrodes at least one of which is transparent, a hole transport layer and a luminescent layer. The layers are stacked in that order between the electrodes, the hole transport layer being formed from bis-di(p-tolyl)aminophenyl-1, 1-cyclohexane, and the luminescent layer being formed from a material having a luminescent peak at 460–480 nm and a thickness of 100–300 Å.

4 Claims, 3 Drawing Sheets

5,283,132

ORGANIC ELECTROLUMINESCENT DEVICE FOR WHITE LUMINESCENCE

FIELD OF THE INVENTION

The present invention relates to a novel organic electroluminescent device, and more particularly to an organic EL device emanating white light.

RELATED ART

Organic EL devices in general exhibit luminescence of relatively high luminance when applied with a relatively low DC voltage (less than 20 V). In addition they are readily capable of emanating light from blue to red if a material of the luminescent layer thereof is appropriately selected. Accordingly, fundamental studies on the organic EL devices are being intensively made in order to apply them to displays and the like.

In application of the organic EL devices to a monochromatic display, they frequently need to exhibit white luminescence for displays of office automation equipment such as a word processor and the like. For satisfying this requirement, the following methods are considered: (a) co-evaporating three luminescent materials for red (R), green (G) and blue (B) luminescence to form a luminescent layer on a substrate, thereby combining the three luminescent colors to obtain white luminescence; and (b) depositing separately on the same plane of a substrate the three materials for R, G and B luminescence to form a luminescent layer with a mosaic or striped pattern of the three materials, thereby obtaining white luminescence on the basis of simultaneous luminescence of R, G and B. These methods, however, have disadvantages: namely, the former method requires to have three evaporation sources and to accurately control evaporation conditions for respective luminescent materials for obtaining satisfactory white luminescence; on the other side, the latter method suffers from a time-consuming and complicated fabrication process because the three luminescent materials must be deposited separately.

SUMMARY OF THE INVENTION

The present invention has been accomplished in view of the foregoing situation, and aims to provide an organic EL device capable of exhibiting white luminescence with good reproducibility by combining luminescence from a luminescent layer with that from a hole transport layer, and which EL device can be fabricated by using conventional fabrication equipment and processes.

Thus, the present invention provides an organic electroluminescent device for white luminescence, which comprises a pair of opposite electrodes at least one of which is transparent, a hole transport layer and a luminescent layer which are stacked in that order between said electrodes, said hole transport layer being formed from bis-di(p-tolyl)aminophenyl-1,1-cyclohexane, said luminescent layer being formed from a material having a luminescent peak at 460–480 nm and a thickness of 100–300 Å.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

In an embodiment of the present invention, when an organic EL device is applied with a relatively low DC voltage (less than 20 V) with the electrode adjacent the hole transport layer being used as a positive electrode and the other electrode as a negative electrode, holes are transported from the positive electrode to the luminescent layer through the hole transport layer while electrons are injected into the luminescent layer from the negative electrode, whereupon the holes and electrons are recombined with each other in the luminescent layer to generate excitons. The excitons thus generated cause luminescence from the luminescent layer, and at the same time some of them reach the hole transport layer due to diffusion to cause luminescence from the hole transport layer as well. Since the material of the hole transport layer has a luminescent peak at 590 nm, use of a material having a luminescent peak at 460–480 nm for the luminescent layer causes the luminescent colors of the hole transport layer and the luminescent layer to combine with each other, thus rendering the luminescence visually white as a whole. Thus, the present embodiment does not require co-evaporation of the three luminescent materials for R, G and B or separate evaporations of the three materials to form a luminescent layer with a mosaic or striped pattern of R, G and B, therefore avoiding a complicated fabrication process.

According to the present embodiment, an electron transport layer may be provided on the luminescent layer to facilitate transport of electrons from the negative electrode to the luminescent layer.

Now, the preferred embodiments of the invention are to be described in more detail with reference to the drawings.

Figure 1:
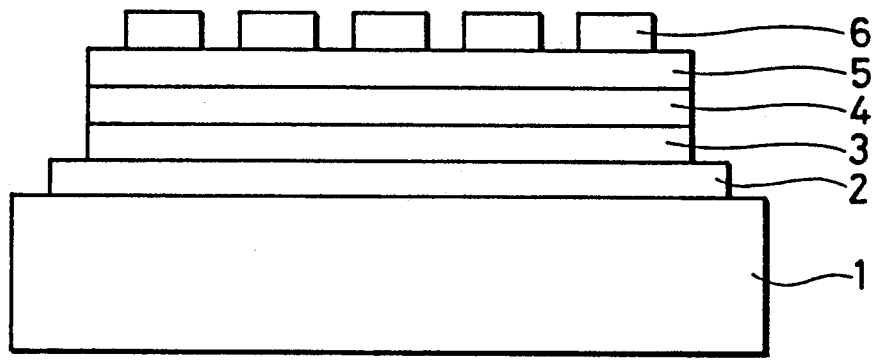
FIG. 1 is a sectional view schematically illustrating an organic EL device as a first embodiment of the invention.

Referring to FIG. 1, an organic EL device as a first embodiment of the invention includes a glass substrate 1, a transparent electrode 2 formed by depositing ITO on the substrate 1, a three-layer structure including in sequence a hole transport layer 3, a luminescent layer 4 and an electron transport layer 5, and a back electrode 6 formed on the electron transport layer 5 by co-evaporating Mg and Ag. The hole transport layer 3 is formed from bis-di(p-tolyl)aminophenyl-1,1-cyclohexane. The luminescent layer 4 is formed from 1,1-di(p-methoxyphenyl)-4,4-diphenylbutadiene as a material having a luminescent peak at 460–480 nm. The electron transport layer 5 is formed from 2-(4-biphenylyl)-5-(4-t-butylphenyl)-1,3,4-oxadiazole. These source materials, which are of powder form, are sequentially deposited on the glass substrate 1 having the transparent electrode 2 at an evaporation rate of 1–3 Å/sec by a heat resistive vapor deposition technique, with the substrate 1 being at room temperature.

Figure 3:
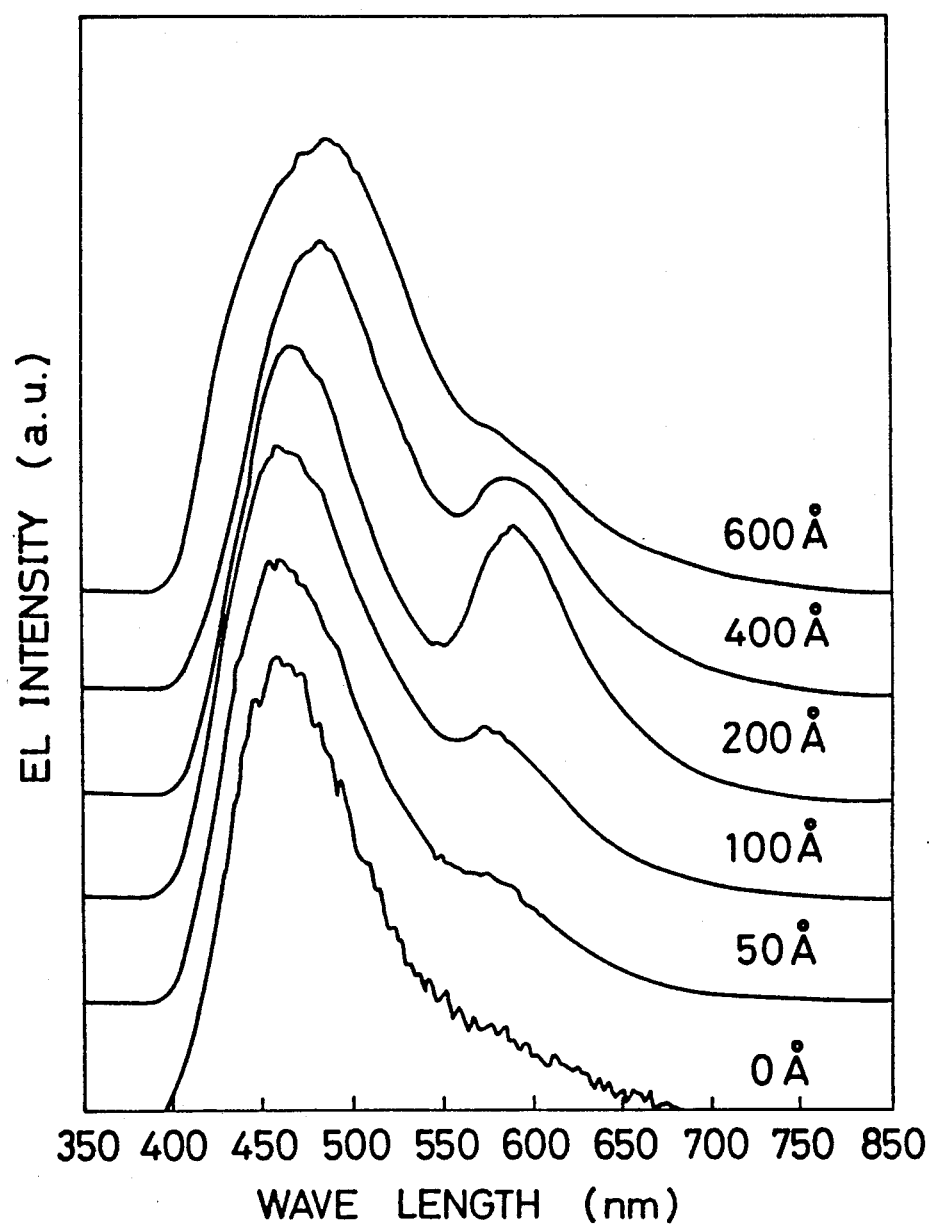
FIG. 3 is a graph showing variation in the emission spectrum of an EL device with variation in thickness of the luminescent layer.

FIG. 3 shows emission spectrum variation of the above EL device when the thickness of the luminescent layer 4 was varied while the thicknesses of the hole transport layer 3 and electron transport layer 5 were fixed to 750 Å and 500 Å, respectively. As seen from FIG. 3, there existed luminescence from the luminescent layer 4 having a peak at 480 nm and that from the hole transport layer 3 having a peak at 590 nm, and the sharpness of the 590 nm peak varied depending on the thickness of the luminescent layer 4.

Figure 4:
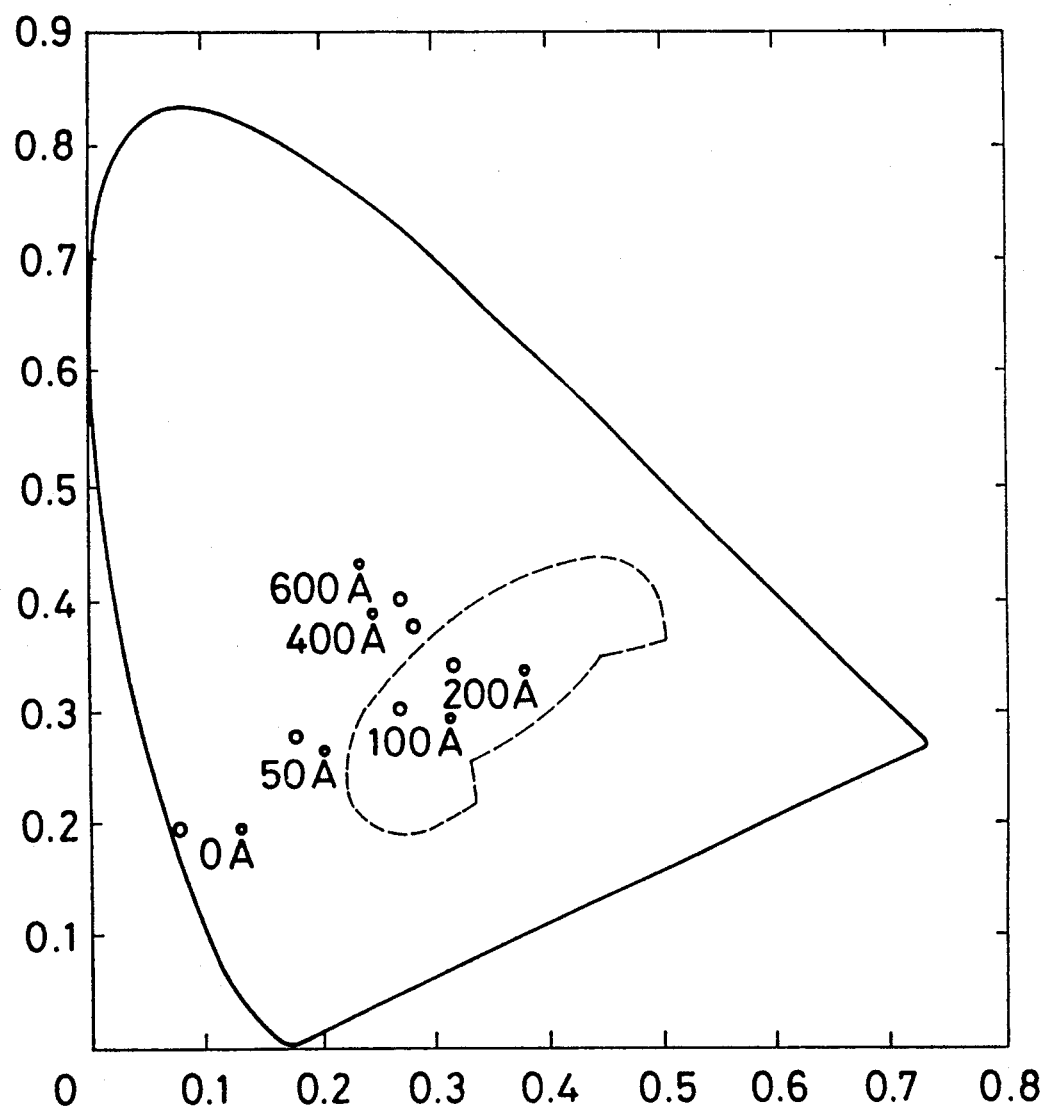
FIG. 4 is a graph showing variation in the chromaticity of the EL device with variation in thickness of the luminescent layer.

FIG. 4 shows chromaticity variation of the luminescence from the device in the case of FIG. 3. As seen from FIG. 4, good white luminescence was obtained when the thickness of the luminescent layer 4 was in the range of 100-300 Å. When the thickness thereof was less than 100 Å, the sharpness of the 590 nm peak was unsatisfactorily lessened. This is conceivable because the hole transport layer 3 was in contact with the electron transport layer 5 because of the island structure essential to the very thin luminescent layer, thereby inhibiting the excitons from reaching the hole transport layer 3. On the other hand, when the thickness of the luminescent layer 4 was 400 Å or more, the 590 nm peak finally disappeared. This is conceivable because the excitons could not reach the hole transport layer 3 since they have a diffusion length of only about 200 Å.

Both the hole transport layer 3 and the electron transport layer 5 usually have a thickness of 300-2000 Å, preferably 400-800 Å. When the thickness thereof is less than 300 Å, pinholes are prone to occur, while when the thickness thereof is more than 2000 Å, too high voltage is needed.

Figure 2:
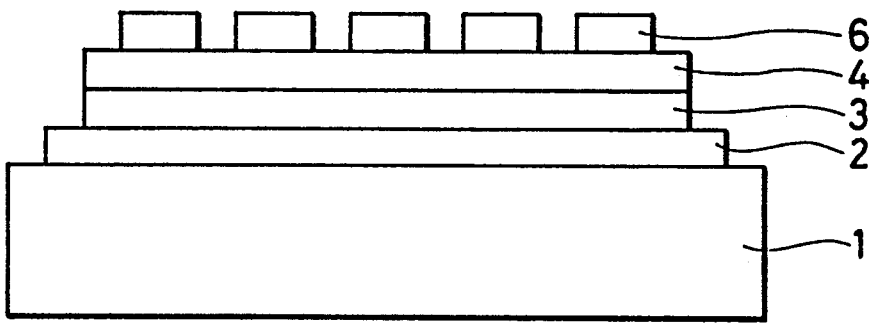
FIG. 2 is a sectional view schematically illustrating another organic EL device as a second embodiment of the invention.

FIG. 2 shows another organic EL device as a second embodiment of the invention, of which arrangement is substantially the same as that of the first embodiment except that a double-layer structure including a hole transport layer 3 and a luminescent layer 4 is employed instead of the three-layer structure of the first embodiment. In this case, when the organic EL device is applied with a relatively low DC voltage (less than 20 V), holes are transported from a positive electrode 2 to the luminescent layer 4 through the hole transport layer 3 while electrons are injected into the luminescent layer 4 directly from a negative electrode 6, and the holes and electrons are recombined with each other in the luminescent layer 4 to generate excitons. The excitons thus generated cause luminescence from the luminescent layer 4, and at the same time some of them reach the hole transport layer 3 due to diffusion to cause luminescence from the hole transport layer 3 as well.

The above EL device was measured with respect to emission spectrum variation and chromaticity variation as in the first embodiment. The results of the measurement were substantially the same as with the case of the first embodiment.

It should be understood that although 1,1-di(p-methoxyphenyl)-4,4-diphenylbutadiene is used as the material having a luminescent peak at 460-480 nm for forming the luminescent layer 4 in the preferred embodiments, the present invention may use, for example, 1,1-di(p-ethoxyphenyl)-4,4-diphenylbutadiene or 1,1-di(p-propoxyphenyl)-4,4-diphenylbutadiene for the luminescent layer 4. Further, the material for the electron transport layer 5 is preferably a material having a high electron mobility. Such a material may include 1,3-bis{2-(4-tert-butylphenyl)-1,3,4-oxadiazo-5-yl}benzene for example besides 2-(4-biphenylyl)-5-(4-t-butylphenyl)-1,3,4-oxadiazole as used in the embodiments.

Thus, according to the embodiments of the present invention, a high-quality organic EL device for white luminescence can be fabricated in a simplified manner with the use of existing fabrication equipment and processes, without requiring complicated which is essential to the conventional art, such as the co-evaporation of the three luminescent materials for R, G and B under precisely controlled evaporation conditions or the separate evaporations of the three materials for forming a luminescent layer of a mosaic or striped pattern.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims:

What is claimed is:

1. An organic electroluminescent device for white luminescence, comprising:
   a pair of opposite electrodes at least one of which is transparent; and
   a hole transport layer and a luminescent layer which are stacked in that order between said electrodes, said hole transport layer being formed from bis-di(p-tolyl)aminophenyl-1,1-cyclohexane, said luminescent layer being formed from a material having a luminescent peak at 460-480 nm and a thickness of 100-300 Å.

2. An organic electroluminescent device as set forth in claim 1, wherein said material having a luminescent peak at 460-480 nm is selected from the group consisting of 1,1-di(p-methoxyphenyl)-4,4-diphenylbutadiene, 1,1-di(p-ethoxyphenyl)-4,4-diphenylbutadiene and 1,1-di(p-propoxyphenyl)-4,4-diphenylbutadiene.

3. An organic electroluminescent device as set forth in claim 1, further comprising an electron transport layer formed on said luminescent layer so that said hole transport layer, said luminescent layer and said electron transport layer are stacked in that order between said electrodes.

4. An organic electroluminescent device as set forth in claim 3, wherein said electron transport layer is formed from a material selected from the group consisting of 1,3-bis{2-(4-tert-butylphenyl)-1,3,4-oxadiazo-5-yl}benzene and 2-(4-biphenylyl)-5-(4-t-butylphenyl)-1,3, 4-oxadiazole.

* * * * *